Oct. 18, 1932.  O. U. ZERK  1,883,277
LUBRICATION METHOD AND MEANS
Filed Oct. 7, 1929  5 Sheets-Sheet 1

Inventor:
Oscar U. Zerk.
By Brown, Jackson, Boettcher & Dienner
Attys.

Oct. 18, 1932.　　　O. U. ZERK　　　1,883,277

LUBRICATION METHOD AND MEANS

Filed Oct. 7, 1929　　　5 Sheets-Sheet 2

Inventor:
Oscar U. Zerk

Oct. 18, 1932.   O. U. ZERK   1,883,277
LUBRICATION METHOD AND MEANS
Filed Oct. 7, 1929   5 Sheets-Sheet 3

Inventor:
Oscar U. Zerk

Patented Oct. 18, 1932

1,883,277

UNITED STATES PATENT OFFICE

OSCAR U. ZERK, OF CHICAGO, ILLINOIS, ASSIGNOR TO ALEMITE CORPORATION, OF CHICAGO, ILLINOIS, A CORPORATION OF DELAWARE

LUBRICATION METHOD AND MEANS

Application filed October 7, 1929. Serial No. 398,065.

My invention relates to the art of lubrication and is more particularly concerned with the lubrication of certain classes of bearings which are adapted to employ lubricant of heavy body, such as grease or high viscosity oil.

In general, such bearings are not high speed bearings, that is rotate under 2000 R. P. M. and in many cases have a rocking or partial turning movement only.

I shall herein show, by way of illustration but not of limitation, my present invention as applied to certain chassis bearings of an automobile to which the invention is well adapted.

It is to be understood that the invention is adaptable equally well to automotive work, more particularly to the lubrication of the chassis of vehicles, such as automobiles, tractors, gun carriages, war tanks, locomotives, airplanes, etc., or to industrial lubrication, that is to the lubrication of stationary machinery, such as stamping presses, printing presses, textile machinery, shafting, and others of the numerous types of machines and machine tools of modern industry.

The present invention is furthermore particularly useful for the lubrication of bearings which have heretofore been lubricated intermittently, that is, where lubricant is periodically injected into them, but the invention is not to be restricted to that particular use as the bearings and lubricating method of my invention provide certain advantages for continuous lubrication, particularly of the non-circulating type.

The desired object in the lubrication of a bearing is to keep the metal surfaces which move with respect to each other from engaging directly by maintaining between them a film of lubricant. Any solid or non-lubricating particles which enter the bearings tend to defeat the purpose of the lubricant by forming a solid bridge between the two bearing surfaces.

In bearings employing grease, particularly in automotive work, dirt and grit are often contained in the grease. The same is true to a certain extent where heavy oil is employed. In addition, metal particles become detached from the surfaces and defeat to a certain extent the film of lubricant. Also, in bearings exposed to dirt and dust, as for example the chassis bearings in a vehicle, non-lubricating particles tend to become deposited between the bearing surfaces.

Grease also tends to leave a deposit of soap which is undesirable and particularly so, if it embeds grit, scale or other solid particles.

The chief object of the present invention is to provide a novel bearing and method of lubrication which shall maintain the bearing surfaces substantially free of non-lubricating material and properly supplied with the desired film of lubricant.

The accepted practice heretofore has been to provide a substantially closed chamber or pocket in communication with the bearing surfaces and into this pocket to force periodically charges of grease or heavy oil. No structural provision is made for the removal of grit, metal particles, etc. from the bearings. Such non-lubricating particles are deposited either in a part of the bearings or in said closed chamber or pocket.

If the particles are deposited in the bearings, they tend to freeze up the bearings. If they are deposited in the chamber or pocket, by working of the bearing they are then forced again into the bearings by the next operation of injected lubricant into the pocket.

According to my invention, the chamber or pocket is dispensed with and an open passageway provided instead. This passageway communicates with an inlet which may be of known or any desired form extending to a suitable point outside the bearings surfaces. This open passageway functions in the following capacities.

1. To serve as a supply chamber for lubricant which, by the motion of the bearing surfaces, is carried between them in the form of a lubricating film.

2. To serve as a repository for non-lubricating particles which, by the motion of the bearing surfaces, are wiped, rolled, or scraped into the groove and tend to remain therein.

3. To serve as a channel through which the non-lubricating particles and the remaining lubricant contaminated thereby may be freely discharged beyond the bearing surfaces by the introduction of fresh lubricant.

I have discovered that this construction provides as a consequent result, a highly important advantage, namely, the ability to introduce the lubricant by low pressure only.

This advantage is so important that it tends to overshadow the main purpose of the invention.

It makes possible the use of simpler and less expensive lubricant compressors, guns or pumps, the latter used in centralized lubrication. It renders the operation of a gun or pump much simpler and more expeditious. For example, when a hand gun of the screw operated plunger type is employed, less time and energy are required to discharge the required quantity of lubricant. Compression or decompression, which was formerly necessary to uncouple the coupling members of a high pressure grease gun, is not required when a low pressure gun is used and consequently less wastage due to leakage of lubricant occurs. The tightness of the fit between parts is not so important and particularly the fit of the nozzle and nipple in lubricating apparatus of the contact type may be much more readily maintained because of greatly decreased pressure.

There are numerous other advantages of the invention which will become more apparent from the following detailed description.

I show in detail herein the shackle bearings of an automobile as in them the advantages of the invention become readily apparent. In this connection I may point out that the invention facilitates the manufacture of such bearings and provides certain manufacturing and structural advantages not heretofore possible.

I shall now outline briefly how, in the specifically described form of bearings, I secure the desired result of a self-cleaning, low-pressure bearing.

In bearings used for chassis lubrication of automobiles which are subjected to shocks and sudden heavy loads, a small substantially crescent shaped space is formed between the bearing and its bushing. It is of course desirable to keep the bearing tight so that rattling or motion of the bearing in its bushing is prevented. While the thickness of the substantially crescent shaped clearance space, above referred to, varies in practice very often this thickness at its greatest dimension is about .003 of an inch, while near the two ends of the clearance, viewing the same in cross-section through the bearing, it may be less than .0001 of an inch and gradually tapers to zero at the point where the bushing and bearing are in engagement to support the load.

In such bearings as previously constructed, the presence of a closed groove or pocket provides no relief except at the widest part of the clearance for grit, scale, metal particles and the soap which is the result of the separation of the oil from the grease.

It is well known that the pounding and churning action upon grease due to the vibration of the bearing in its shackle or vice versa, tends to separate the oil out of the grease leaving a deposit of soap which, with the grit metal particles and the like, tends to form a hard deposit, not only in the closed end groove, but also in the clearance of the bearing and bushing which has no other outlet, the bearing tending to become frozen and the bolt and bushing resisting movement relative to each other.

It has been attempted, according to the prior art, to remedy this condition by forcing grease or oil into the bearing under high pressure or exceedingly high pressure, often termed, "super-pressure" or "booster-pressure". When such oil or fresh grease has been forced into the bearing and has penetrated more or less of the frozen portion between the bolt and bushing, for example, it usually follows only one very narrow channel in the deepest part of the crescent shaped clearance between the parts. When the bearing parts are again relatively movable, it has generally been thought heretofore that the bearing is then properly lubricated. This, however, is not the case because the filled tapered side portions of the crescent shaped space adjoining the widest portion of the clearance, which have been opened by the fresh lubricant forced through the same at super-pressure still remain charged with non-lubricating particles and in a relatively short time the bearing again becomes frozen.

The cross hole or inlet duct in the bolt or bushing may become clogged with solid material and the same can be opened only by the application of super-pressure which forces such additional solid material into the bearing itself. Bearings are often constructed with a circular groove in the bolt registering with the cross hole in the bolt or other entering duct for lubricant, but this does not materially alter the case, since such a circular groove extends only along a short part of the length of the bearing and as such circular groove has an outlet only in the longitudinal groove in the bolt or in the bushing,—providing a longitudinal groove is used in addition to a circular groove,—the circular groove itself become a depository for solid particles and gradually fills up and becomes useless. The tendency therefore is the same to accumulate solid particles which gradually tend to freeze up the bearing.

It has been very strongly advertised and therefore is often believed that high-pressure lubrication forces out all of the old grease from a bearing and replaces the same with new clean grease all over the bearing surfaces. In fact, it has heretofore been thought that only high-pressure lubrication would give the desired result of supplying the bearing with the proper film of lubricant. As high-pressure has failed to produce this result, super-pressure has been introduced but has failed to get the desired results.

By high-pressure in chassis lubrication, a pressure of from 300 to 1000 lbs. per square inch is designated. Super-pressure lubrication usually relates to pressures of from 1,000 to 10,000 lbs. per square inch. But the solution of the problem is not the degree of pressure applied for no matter by what pressure the grease is introduced,—it being composed of hard soap and liquid oil—it has the property of separating its two ingredients under the continuous alternating pressures which agitate or pound it, as butter is separated out of cream. Also, the inability to clean out the narrow parts of the clearance regardless of the pressure employed, results in a more definite forcing or wedging of the solid or non-lubricating particles into such narrow space and in that respect tends all the more to compact in such narrow clearance space the non-lubricating particles. Any new grease which is forced into the bearing at high pressure will move in a relatively narrow channel at the widest portion of the crescent shaped play, naturally choosing the path of least resistance and failing to clean out along the sides where the narrow clearance exists, the soap, grit, metal particles and the like which are merely more firmly lodged in such position.

Furthermore, the use of high or super-pressure has a direct influence upon all of the parts of the lubricant guns and lubricant receiving nipples and the like, especially in the construction of the couplings where the grease gun is temporarily rigidly connected to the lubricant receiving nipple.

These couplings are apt to leak considerably under high pressure when grit which is deposited on all nipples of an exposed machine, such as an automobile bearing, is not thoroughly cleaned off before applying the grease gun nozzle, and it is substantially never cleaned off the nipple; either by the owner of the vehicle nor at the service stations.

The presence of such grit upon the nipple which remains between the nipple and the coupling, causes leakage which makes it necessary to use many times more grease in lubricating a bearing with a high pressure grease gun than the bearing actually needs, with the result that the cost of grease used is many times higher than necessary and the escape of the grease at the couplings and nipples is messy and undesirable.

With my system, not only is proper lubrication secured, grit, soap, and non-lubricating particles being easily and readily carried out of the bearing, but this is performed at unusually low pressure, that is pressures at from 10 to 25 lbs. per square inch. Also, far less grease or none at all, leaks around the coupling members even with the presence of grit upon the external surface of the nipple or the like.

While the chief object of the invention as above stated is to secure proper lubrication. it is an equally important object of the present invention to secure the same by the use of low pressure only.

Another object of the invention is to provide an improved bearing construction which makes the above method of operation possible.

Another object of the invention is to secure a selective filtering action in a bearing lubricated by lubricant containing grit or other non-lubricating impurities so as to permit the lubricant to pass between the bearing surfaces, but to retain or hold back the impurities and discharge them out of the bearings at each succeeding injection of fresh lubricant, or in other words it is my object to force impurities of the lubricant out of the bearing instead of into the bearing.

A further object of the invention is to provide suitable structures which will carry out the above in a simple and effective manner.

Another object of my invention is to provide the combination with a bearing having the aforesaid advantages and from which resistance to the introduction of grease has been substantially eliminated, of suitable means for receiving any kind of lubricating apparatus or system.

Another object of the invention is to provide a bearing structure which can be properly lubricated by relatively low pressure and which eliminates the necessity for any such high pressure as are now considered necessary to properly lubricate bearings.

Another object of my invention is to have a longitudinal channel or channels in the bearings or in the bushings extend from the cross-hole in the bearings or a cross-hole in the bushings and through which the lubricant is fed, to at least one end of the bearing to discharge at a point at or near the ends of the bearing surfaces.

Another object of my invention is to have in one form of the invention, the groove of my invention extended radially from the cylindrical portion to afford an outlet through a radial passageway formed in one of the members or disposed along a radial bearing surface.

Another object of the invention is to form the groove of my invention in two sections, namely, a groove in one of the cylindrical parts of the bearing and a communicating groove or passageway along the radial face of the bearing and further to keep these two sections in free communication by a communicating circumferential passageway.

Another object of the invention is to form the the radial extension of the groove or grooves in the shackle or shackle bolt bearing by a drop forging or stamping operation.

Another object of the invention is to employ these grooves or any part of them, or extensions of them, as means for scraping from the bearing surfaces, or any part of them, non-lubricating particles or accumulated impurities, particularly where a highly viscous lubricant is employed.

Another object of my invention is to provide in a bearing a lubricant reservoir in the form of a channel or channels extending from end to end of the bearing, or otherwise substantially throughout the bearing, such reservoirs being in constant free communication with the bearing surfaces.

Another object of the invention is to provide in a bearing of the above type, a split bushing made of sheet metal bent to shape.

Another object of my invention is to provide bushings either of solid tubing or of formed sheet metal in which the grooves or channels are formed by broaching, stamping, pressing or drawing.

A further object of my invention is to embody the method and means above described in a shackle bolt bearing for vehicles.

Other and further objects will become apparent from the following description and the appended claims.

Now in order to acquaint those skilled in the art with the manner of constructing and operating a device embodying my invention, I shall describe in connection with the accompanying drawings, a specific embodiment of my invention and its mode of use.

In the drawings.

Figure 6 is a vertical section through a pair of shackle bearings connected by shackle links, the upper bearing illustrating the mode of operation of the present invention and the lower bearing illustrating the construction and mode of operation of known type of bearings.

Figure 1:
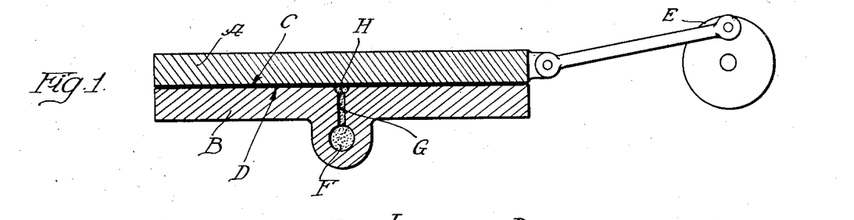
Figure 1 is a diagrammatic showing of two bearing parts, illustrated in section.

Referring now to Figure 1, I have shown therein two bearing members A, B having plane engaging surfaces, C and D bearing against each other. The upper member A is movable and is adapted to be reciprocated by a mechanism, such as E. The member B has an inlet passageway F for the introduction of lubricant between the surfaces C and D. The horizontal passageway F communicates by way of a vertical passageway G with a groove H formed in the member B, opening into the plane bearing surface D.

Grease which is forced into the passageway F will reach its place between the bearing surfaces by way of the vertical passageway G and through the distributing groove H. It is to be observed that the groove H is clearly a distributing groove and its function is to distribute lubricant over a wider area than could be done by the mere ending of the vertical passageway G at the surface.

Figures 2, 3:
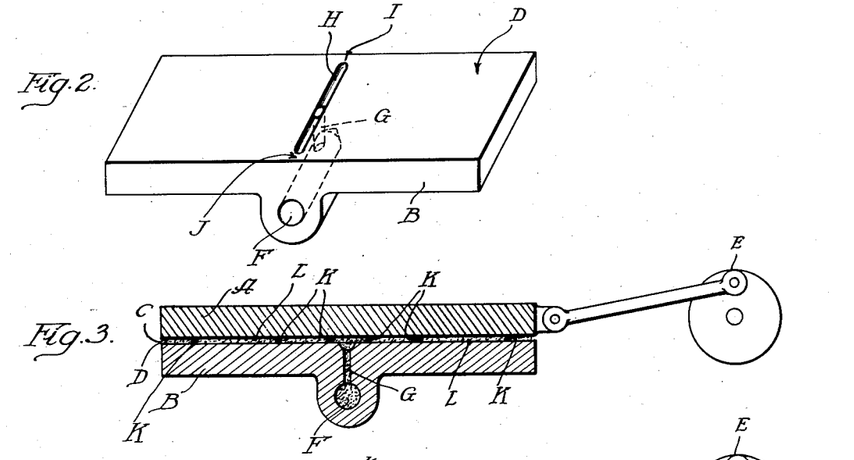
Figure 2 is a perspective view of the lower bearing part, shown in Figure 1.
Figure 3 is a view similar to Figure 1, illustrating the action of the bearing surfaces when grit or non-lubricating particles become deposited between the bearing surfaces.
Figure 4:
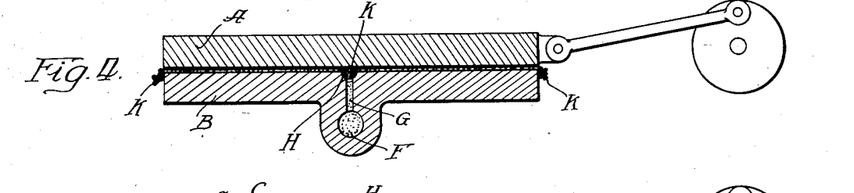
Figure 4 is a view like Figure 3 showing the non-lubricating particles scraped off at the end surfaces and into the central groove.
Figure 5:
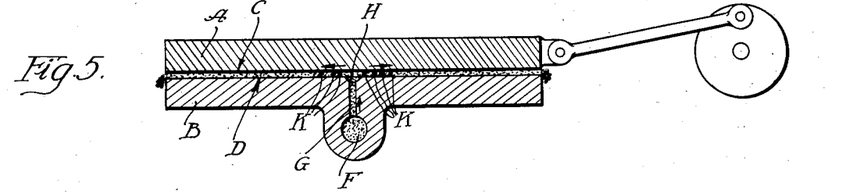
Figure 5 is a view similar to Figure 3, showing the non-lubricating particles introduced between the bearing surfaces by the injection of fresh lubricant.

The groove H stops short of the slide edges of the bearing surface D, solid portions of the bearing remaining at I and J. Now assume that the parts shown in Figures 1 and 2 are supplied with grease or heavy oil containing grit, or that metal particles detach themselves from the bearing surfaces, or that grit otherwise comes between the bearing surfaces C and D, such particles being shown, for example, at KKK. These non-lubricating particles K form solid bridges or struts between the bearing surfaces defeating the action of the film of lubricant L to a large extent. In addition, they tend to cut and abrade the bearing surfaces and their presence in the bearing is, as is well known to the art, undesirable. Assume that to the working of the bearings, that is by movement of the surfaces C—D relative to each other, these non-lubricating particles KK are gradually eliminated, as by scraping off at the ends and as by being scraped off in the distributing groove H. The action of the bearing immediately improves as soon as such non-lubricating particles are eliminated from between the bearing surfaces. But upon the next injection of lubricant, as illustrated in Figure 5, these same particles which were deposited in the distribution groove, are again introduced between the bearing surfaces C and D and the trouble which they cause starts again.

Now while I have shown in the diagrams of Figures 1 to 5, plane surfaces for the bearings and while these have a tendency to eject or wipe off or scrape the non-lubricating particles away from the ends of the bearings, when two cylindrical surfaces are in contact for rocking or rotative motion, such escape is not possible and the grit will stay in the bearing.

As illustrative of this, I refer to the lower half of Figure 6 in which a bearing is shown, having cylindrical parts, namely, the cylindrical bolt member $A_1$ and the cylindrical bushing $B_1$, having cooperating cylindrical bearing surfaces. The bolt $A_1$ has a suitable head M and nut N resting against the outside of the shackle links O and P.

The bolt $A_1$ is provided with a longitudinal supply conduit $F_1$ communicating with a cross-passageway $G_1$ formed by a suitable drilling of the bolt. A circumferential groove Q communicates with the upper end of the cross-drilling $G_1$ extending completely around the periphery of the bolt at the central bearing portion thereof. This groove and the upper end of the cross-drilling $G_1$ communicates with a longitudinal distributing groove $H_1$.

The bushing $B_1$ is held in a cylindrical sleeve R which may be a spring eye formed on the end of a vehicle spring. The bushing $B_1$ is preferably formed of brass or bronze and is of a length actually slightly less than the width of the spring eye R, said spring eye forming the spaces between the inside surfaces of the ends of the links O and P. The supply conduit $F_1$ is at its outer end provided with the lubricating nipple Z of known type and construction. This lubricating nipple Z has a ball check valve S and an inlet opening T through which lubricant is adapted to be forced, past the check valve S into the passageway $F_1$, $G_1$, groove $H_1$ and circumferential groove Q.

As is well known, it is not feasible to make an absolutely tight cylindrical fit for a bearing of this kind, since the parts must have sufficient freedom to insure non-binding action. As a result, the play which is provided in the bearing and which tends to increase with wear is, in cross-section, crescent shaped as may be seen in Figure 7.

Figures 7, 8, 9:
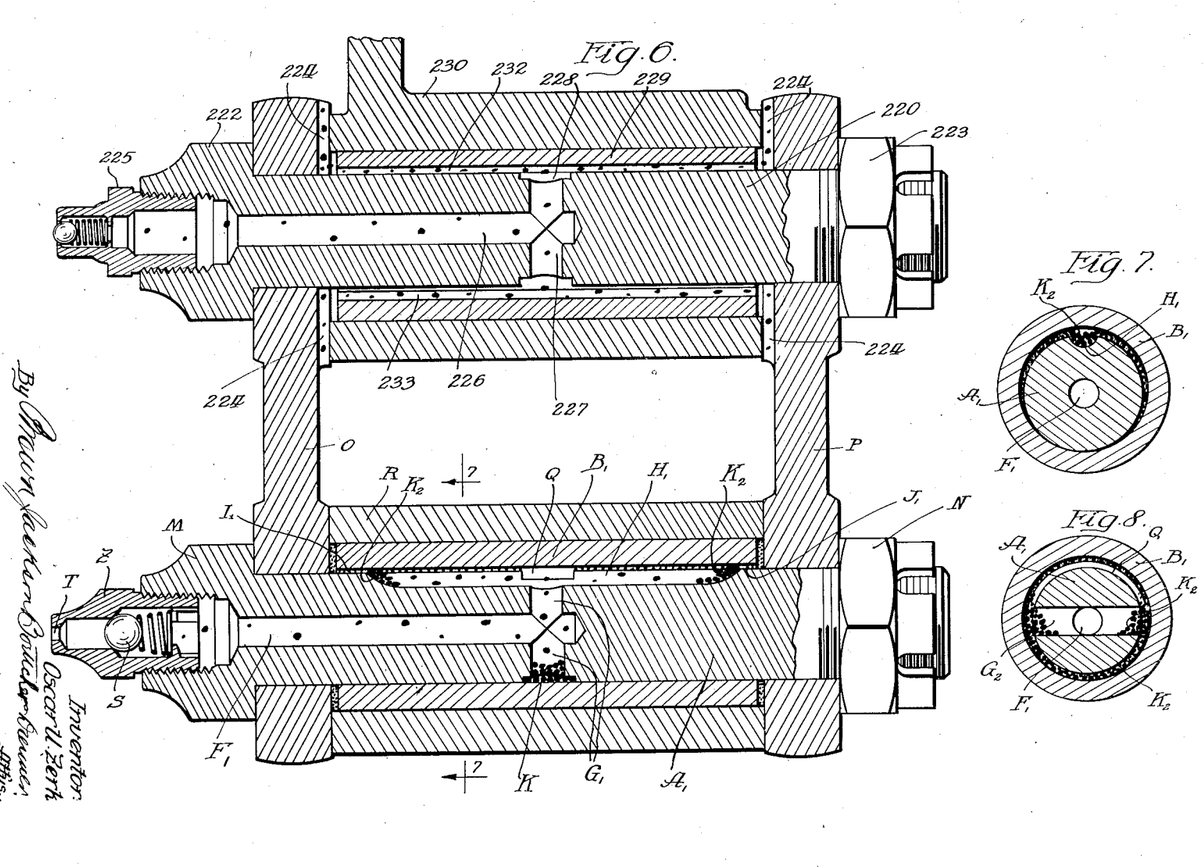
Figure 7 is a sectional view taken on the line 7—7 of Figure 6.
Figure 8 is a similar view taken through a bearing in which the pin has a crosshole communicating with a circumferential groove.
Figure 9 is a vertical section through a pair of shackle bearings showing lubricant supply means for each of the bearings in longitudinal section.
Figure 9:
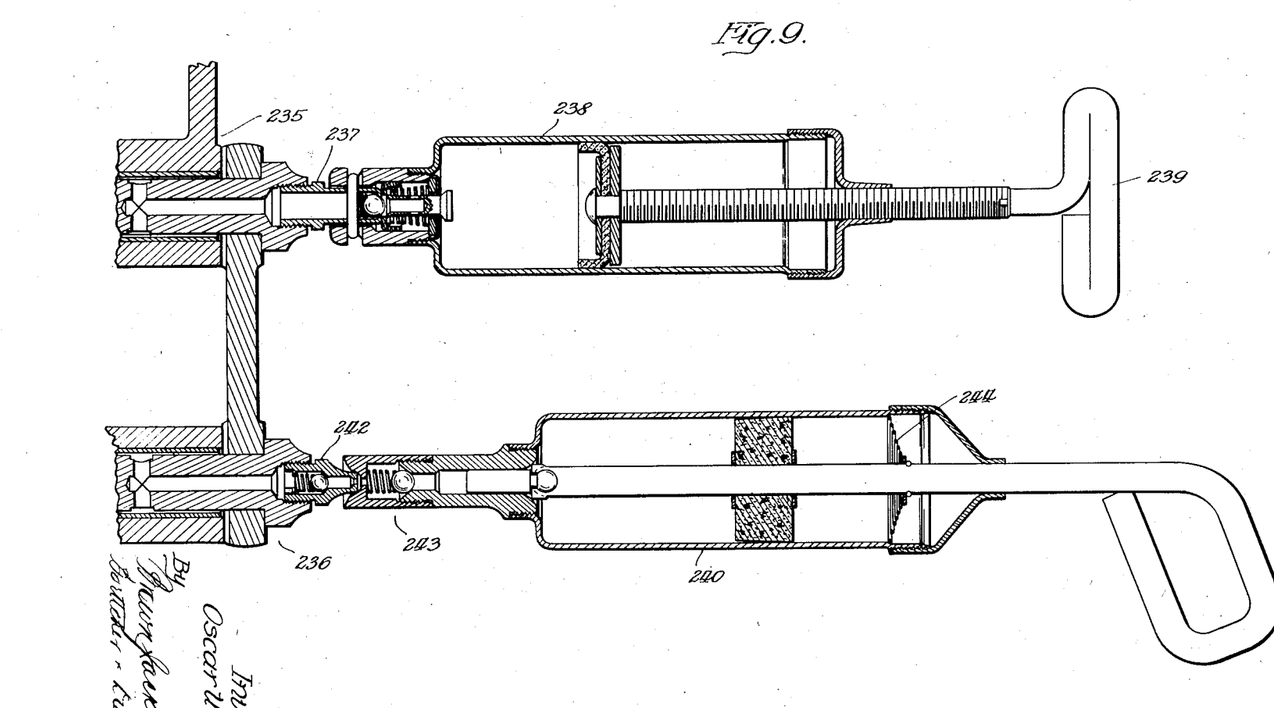

Assuming that the play is of the order of .003 inch at the maximum or at the top as shown in Figure 7, it will be seen that this play is not sufficiently large to permit the larger particles of grit, dirt and the like which are found in grease, to be driven from the end of the distribution groove H' past the portions $I_1$ and $J_1$ where only the crescent shaped play exists.

In other words, the distribution groove $H_1$ does not extend to the ends of the bushings $B_1$ and as a consequence the solid portions $I_1$ and $J_1$ constitute portions of the bearing surface and not of the distribution groove. Particles of grit, scale and other impurities and non-lubricating particles in excess of the size of the crescent shaped clearance at its maximum thickness, occur in grease and hence these larger particles are trapped in the distribution groove, particularly at the ends where they are filtered out and retained, as indicated at $K_2$, $K_2$.

Also such particles are trapped and retained in the bottom of the cross-passageway $G_1$ and in the circumferential groove $Q$. Finer particles of grit which are contained in the grease may be driven out of the bearing, if sufficient pressure is applied, through the central or metal part of the crescent shaped clearance at the ends of the distribution groove, if such particles are of a size sufficient to pass through the clearance.

In the upper part of Figure 6, I have illustrated my improved construction and herein I employ a bolt 220 having the usual head 222 and nut 223 resting against the outside of the shackle links O and P. The links are provided on their inner faces with grooves 224. A suitable lubricating nipple 225 is mounted in the head 222 in communication with a conduit 226 in the bolt. This conduit communicates with a circumferential groove 228 in the bolt by means of the cross-drill 227.

A bushing 229 is held in a cylindrical sleeve 230 which may be formed on the end of an automobile frame and from which the vehicle spring is supported.

This bushing is of slightly less axial length than the cylindrical bearing portion 230 and said cylindrical bearing portion 230 may now be clamped fairly closely between the spaces of the shackle lengths O and P in which the grooves 224 are formed.

These grooves extend from the outer spaces formed on the ends of the links to the hole in which the bolt 220 is disposed. In other words, the grooves or passageways 224 extend directly to the bearing surface of the bolt 220. The bushing 229 has one or more longitudinal grooves 232 and 233 formed therein from end to end of such bushing 229, these grooves 232 and 233 opening freely at their ends into the passageways 224 which extend radially in the spaces of the shackle links. There is of course the crescent shaped clearance between the bushing and the bearing pin 220, but this now functions in a different manner. Instead of having two grooves, such as 232 and 233, four grooves, or any desired number of grooves, more or less than two, may be employed.

The action and mode of operation of this structure may now advantageously be compared with the action of the structure shown immediately below it. The bearing is shown as filled with grease, which has been introduced through the nipple 225. The grease contains particles of grit of various sizes, some large, some small. They are distributed throughout the body of the lubricant and if they are so large that they cannot escape into the crescent shaped clearance, they are thereby automatically screened out to be retained in the escape grooves 232 and 233, as the pin and bearing move with respect to each other, they do not become lodged in such crescent shaped play, but remain in the free escape groove.

The finer particles of grit and dirt which are small enough to pass into the clearance space, may do so freely. However, they tend to become deposited in the grooves which have less clearance by the selective action of scraping and wiping, the finer particles possibly reaching the lowermost groove 233. Upon the next injection of lubricant the coarser particles which were screened out by the screening action and which were retained in the free escape grooves, such as 232 and 233, are now forced endwise of such grooves and out through the radial passageways 224 to the outside of the bearing away from all bearing surfaces.

The incoming grease may have like impurities and such impurities may again be subject to the screening action and to the movement back and forth by the reciprocating or rocking action of the bearing surfaces with respect to each other, tending to concentrate in the grooves and to be expelled therefrom upon the next injection of lubricant. This selective action, is in my opinion wholly new in the art. If, for any cause, the crescent shaped portions should tend to have soap or other non-lubricating particles deposited thereinto, it tends to be broken up by motion of the part and be deposited in the free escape groove from which it is thereafter expelled by incoming grease.

The action of my bearings in tending to screen out particles to keep them from being forced or lodged otherwise between the bearing surfaces, depends upon providing a free passageway for their escape and the provision of such a free passageway of escape is the inherent possibility of the utilization of low pressure.

In general, it is desirable where periodic or intermittent lubrication is relied upon, to discharge substantially fixed quantities of lubricant into the bearing. With the high and excessively high pressure which have heretofore been hoisted upon the art, simple accurate measurement and discharge of a measured quantity of grease or oil into the bearing, by hand or by centralized system, is difficult, if not impossible, to attain. Consider, for instance, in Figure 9 where a bearing 235 of my invention is shown and a nipple 237 and gun 238 of known construction are provided, it has heretofore been difficult to discharge a fixed or substantially fixed quantity of lubricant by hand operation, where high pressure has been necessary. Finer particles of grit, dirt, soap and the like will tend to deposit in the crescent shaped clearance and if as pointed out in connection with the diagrams of Figures 1 to 5 inclusive, such grit is worked back into the distribution groove, it is merely forced back into the bearing again upon the next injection of lubricant. The finer particles are therefore worked back and forth in and out of the distribution groove and tend to be packed into the horns or smallest part of the crescent shaped clearance, the larger particles being retained in the distribution grooves, longitudinal and circumferential.

Figures 22, 27, 28:
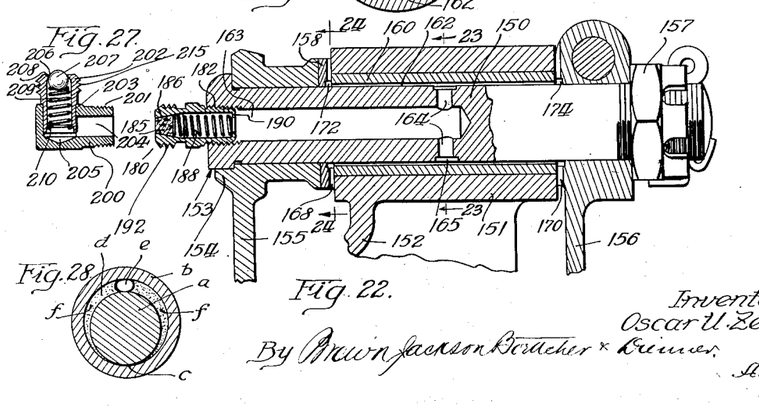
Figure 22 is a fragmentary section similar to Figure 10 showing an embodiment of the invention in connection with another form of shackle connection.
Figure 27 is a longitudinal section through another form of bearing nipple for use with the present invention.
Figure 28 is a diagrammatic cross-section showing the crescent shaped play between the journal and bearing parts of a bearing and illustrating the movement of new grease in a bearing of the prior art supplied with lubricant at "high" or "super-pressure"

Thus gradually there is built up a condition of filling of the bearing with non-lubricating particles and the use of high pressure or super-pressure to force lubricant into the bearing, becomes necessary to get any effective application whatsoever, but even if such high pressure or super-pressure is employed it does not clean out the bearing, for as shown in connection with Figure 28 where the clearance is shown in exaggerated form, the lubricant under pressure tends to escape at the ends of the maximum thickness of the crescent shaped clearance and do nothing whatsoever except more firmly pack the non-lubricating material along the side. The pressure under which the lubricant is introduced has nothing to do with the fundamental laws of aiding the distribution. The lubricant will always seek the path of least resistance, no matter what the pressure is. Thus, in respect to Figure 28, when oil or new grease is forced under high pressure to penetrate the frozen portion between the bolt and bushing, it always chooses the very narrow channel indicated at $e$ in the deepest part of the crescent shaped play, leaving the two center side portions which are filled with soap, grit, metal particles or other non-lubricating material, as indicated at $f$, practically undisturbed, and in a short time the bearing is again frozen.

High pressure lubrication does not force out all of the old grease, or other detrimental accumulation $f$, nor does it replace this accumulation over any substantial part of the bearing surfaces.

The same thing is true in respect to a bearing which has only a circumferential groove for distribution of grease, as shown for example in cross-sectional form in Figure 8, where there is a cross-drilling G2, communicating with the longitudinal drilling F1, and the circumferential distribution groove Q. In this case the larger particles K2 which will not pass through the crescent shaped clearance at its maximum depth will be retained in the circumferential groove Q and just as in the previously described construction, gradually fill up with soap and grit and prevent the entry or distribution of lubricant and if through the use of extremely high pressure, grease is forced through the bearing it will be as described in connection with Figure 28, namely, it will escape through the path of least resistance leaving the bearing otherwise in such condition that it will tend shortly to freeze again.

Figures 10, 11, 16, 17, 18, 19, 20, 21:
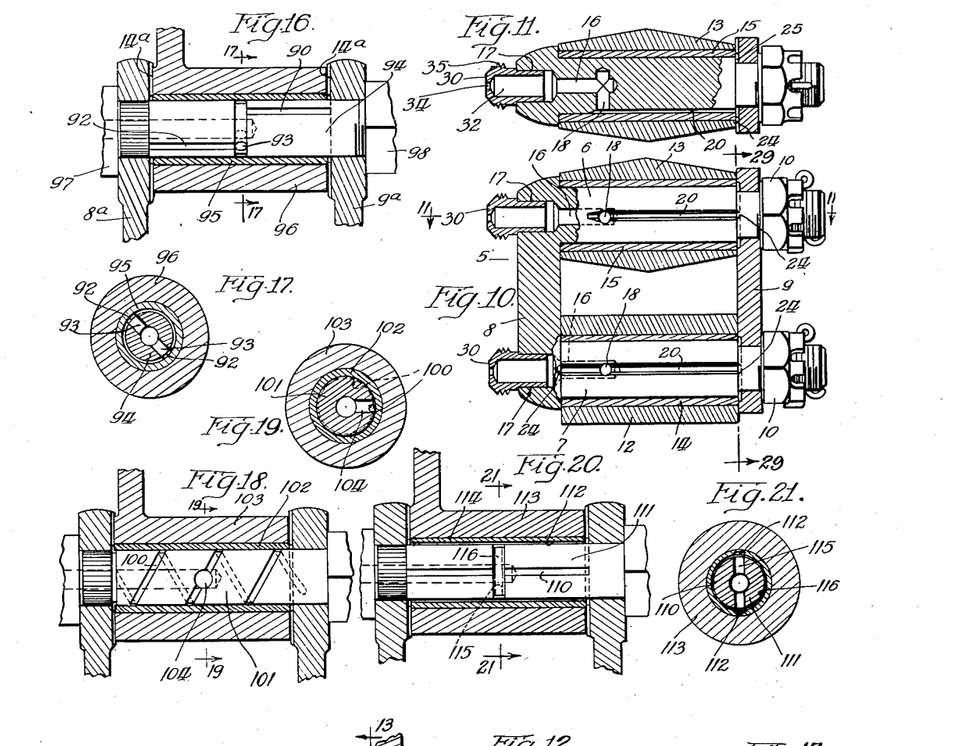
Figure 10 is a generally vertical section, partially in elevation, showing an embodiment of the invention in one form of shackle connection between the frame and spring of an automobile.
Figure 11 is a section taken on the line 11—11 of Figure 10.
Figure 16 is a fragmentary section similar to Figure 10 showing another embodiment of the invention.
Figure 17 is a transverse section taken on the line 17—17 of Figure 16.
Figure 18 is a fragmentary section similar to Figure 16 showing another embodiment.
Figure 19 is a transverse section taken on the line 19—19 of Figure 18.
Figure 20 is a fragmentary section similar to Figures 16 and 18 and showing another embodiment of the invention.
Figure 21 is a transverse section taken on the line 21—21 of Figure 20.

Referring, now, to Figures 10 and 11, the bearings therein illustrated are the shackle bearings of a well known make of automobile showing certain embodiments of the present invention in connection therewith. This shackle comprises a generally U-shaped hanger 5 consisting of a pair of shackle bolts 6 and 7 formed integral with the shackle link 8 at one side of the shackle.

The companion shackle link 9 connects the opposite ends of the bolts 6 and 7, and the nuts 10, on the threaded ends of the bolts, are drawn up to clamp the spring eye 12 and the eye 13 between the links 8 and 9 in the usual manner. The eye 13 may be the usual perch eye in the axle bracket or brake shield bracket, or any other suitable or equivalent eye.

In the particular construction shown, these perch eyes 13, at the opposite ends of the front spring, are usually secured to the front axle and at the opposite ends of the rear spring these perch eye members are usually secured to the brake shield in existing practice. This may, however, vary widely. The spring eye 12 has a suitable bushing 14 between the inner periphery of the eye and the outer periphery of the bolt 7, and the eye 13 has a bushing 15 between the inner periphery of this eye and the outer periphery of the bolt 6. These bushings may be of cylindrical or tubular form, or they may be split bushings, made up of flat stock rolled to shape, and the bushings of the other embodiments selected for illustration may be similarly varied. In fact, any of the bushings shown herein may be of any existing or any suitable or preferred form, and where the bearing is bushed, as shown, the present invention may be embodied between the bolt and the bushing in a wide range of various manners within the scope of the present invention, as will hereinafter appear. This invention is not, however, limited to bearings employing bushings between the bolt and the eye or female part of the bearing, but the invention may be similarly embodied directly between the bolt and eye or other cooperating bearing parts where there is no bushing.

Near the lefthand side, each of the bolts 6 and 7 has an axial drilling or duct 16 which leads in from recesses or counterbores 17 formed in the shackle link 8 and opening from the outer side thereof.

At their inner ends, the drillings 16 open into cross ducts or drillings 18, which in turn open out radially into communication with a groove 20.

I desire to point out here that the channels or grooves 20 are through channels in that they extend from the cross hole 18 in the bolt or from the cross hole in the bushing or female bearing part—it being understood that this cross hole may be in the bushing instead of in the bolt or male bearing part, as shown, or it may be directly in the female bearing part where there is no bushing—to at least one end of the bearing, as distinguished from such longitudinal slots as have been heretofore employed and which have not been through grooves in that they have not extended to both ends of the bearing. In the embodiment of Figs. 10 and 11, the through groove 20, for the bolt 6, is shown as extending to the righthand end of the bearing, whereas the through groove 20 for the bolt 7 is shown as extending to both ends of the bearing. It is to be understood that this is for expediency of disclosure and that the through groove arrangement for both bolts may be alike or different, or varied, as will hereinafter appear. In the embodiment of Figs. 10 and 11, these through grooves 20 are also shown of longitudinal lineal form, but the grooves of this embodiment, as well as the grooves of the other embodiments, or any other applications of the invention, may be either straight, helical or of any other suitable form, as will hereinafter appear.

The through grooves of this embodiment are also shown as disposed in the bolts 6 and 7, but it is to be understood that these grooves, or any of the other through groove arrangements coming within the present invention, may be disposed in the bushing or, where there is no bushing, in the female bearing parts, or they may be placed part in the bolt or male bearing part and part in the bushing or female bearing part. Where bushings are employed, they may be made of solid tubing or formed of sheet metal rolled to shape and the through grooves may be formed by broaching, stamping, pressing, drawing, machining, or otherwise.

In small diameter bearings, I prefer to use not less than two channels, while in larger diameter bearings I prefer to use four or more channels, depending upon the diameter of the bearing.

The through grooves 20 are preferably supplemented at the ends of the bearing by additional free lubricant escape means. This free lubricant escape means is particularly desirable where a side thrust is anticipated. The through channel means may extend to one end of the bearing only and, in that case, supplemental escape means at that one end of the bearing alone will suffice, but preferably, the channels extend to both ends of the bearing and supplemental escape means is therefore preferably provided at both ends of the bearing.

In the embodiment illustrated in Figures 10 and 11, this supplemental escape means is in the form of side channels or grooves 24, these grooves 24 being provided at one end only of the bearing of the eye 13 upon the bolt 6, namely, at the end to which the through channel 20 extends. The through groove 20 for the other bolt 7, extending to both ends of the bearing, these side channels 24 are shown as provided at each of the opposite ends of the bearing of the bolt 7 in the eye 12. In the illustrated embodiment, these supplemental free lubricant escape channels 24 at the ends of the bearings are formed in the inner surfaces of the shackle links 8 and 9 and open across these surfaces from one side to the other, and as also with other bearing channels may be formed by machining, stamping, pressing, broaching, or otherwise.

It is to be understood that these side channels may be formed in the eye members 12 and 13 or, if washers are interposed between the ends of these eye members and the shackle links, these end escape channels 24 might be formed in these washers or they may be otherwise disposed to provide additional free lubricant escape means at the ends of the bearings, particularly where a side thrust is anticipated as in the particular embodiment of the invention selected for illustration herein.

These end escape channels 24 are disposed in communication with the ends of the through channels 20 and, where there is a relative turning movement, for example, between the eye member and the shackle link, this communication between the through channels and the end channels is preferably assured at all times by the provision of circular channels 25 (Fig. 11), which are in continual communication with the ends of the through channels 20 and which are, in turn, in open communication with the end channels 24.

From the foregoing, it will now appear that the through channels 20, and where these channels are supplemented by free lubricant escape end channels, these channels 20 and the end channels secure the desired cleaning and lubrication functions and at the same time remove most, if not all, of the resistance in the bearing to the incoming lubricant, with the result that I am thereby enabled to use a low pressure lubricant supply, whereas high pressure lubricant supplies and super-pressure lubricant supplies only have been deemed satisfactory heretofore. This substantially resistless bearing and its combination with a source of lubricant supply, and particularly with a source of low pressure lubricant supply, is, so far as I am aware, broadly new, and by these provisions I greatly improve the lubrication over that obtained by bearings of the prior art even when used with "high pressure" or "super-pressure" systems, all as more fully set out in the preamble to this specification.

For the purpose of placing the bearings in communication with the lubricant supply source, I preferably provide each bearing with a lubricant receiving nipple 30. The particular nipples shown in this application are of the rigidly connected coupling type, that is, they are adapted to provide a coupling connection between the grease gun and the bearing. The inner end of the nipple 30 is cylindrical externally, or otherwise formed and of a diameter which will provide a tight driving fit in the recess 17, in which the nipple is secured by driving engagement therein.

Figures 23, 24, 25, 26, 29:
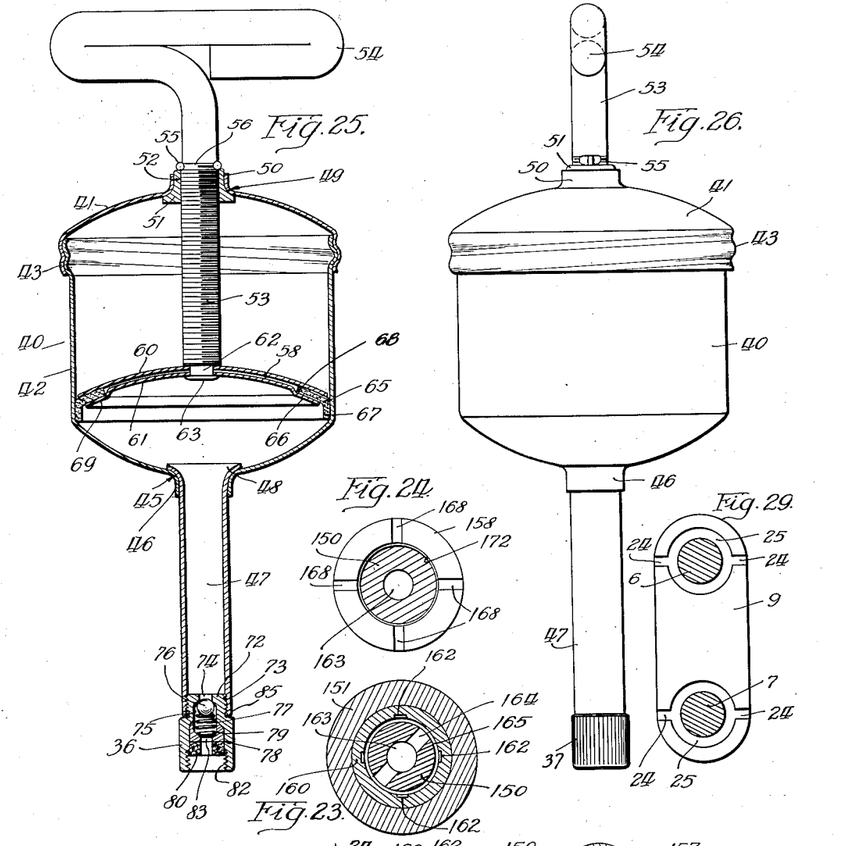
Figure 23 is a transverse section taken on the line 23—23 of Figure 22.
Figure 24 is a transverse section taken on the line 24—24 of Figure 22.
Figure 25 is a longitudinal axial sectional view of a grease or oil gun forming a source of lubricant supply, and particularly a low pressure source of lubricant supply for the present invention.
Figure 26 is an elevational view of the gun shown in Figure 25.
Figure 29 is a section on line 29—29 of Figure 10.

Each nipple 30 is hollow or tubular providing the internal chamber 32 which opens into communication with the duct or drilling 16 and the outer end of the nipple has the reduced or restricted lubricant charging inlet 34. The outer end of the nipple is enlarged or headed slightly, and this enlarged or headed end is externally threaded at 35. The thread 35 is preferably a relatively short quick thread for quick detachable threaded engagement with the correspondingly internally threaded connector 36 at the end of the lubricant gun (Fig. 25 and Fig. 26). The bearings being lubricated by low pressure lubrication with the present invention the nipples 30 may be left in open condition when the gun or lubricant source is disconnected and the spring or otherwise operated check valves may thereby be eliminated from the lubricant receiving nipples, although it is to be understood that a conical cork check valve, or other suitable check valve, may be employed, particularly in the case of lubricating a water pump where it is desired to prevent the fluid from escaping from the intake opening of the lubricant receiving nipple when the gun or lubricant source is disconnected.

The grease or oil gun shown in Figs. 25 and 26 forms a part of, and is claimed in, a patent issued to Oscar U. Zerk on February 25, 1930, No. 1,748,817, but is illustrative herein of any suitable gun and any suitable lubricant pressure supply and specifically a low pressure lubricant supply in combination with the improved bearing of the present invention.

This gun comprises a lubricant container or barrel 40 comprised of two sections 41 and 42 connected together at 43 as by means of short quick threads which may be pressed in the adjacent telescoping portions of the barrel sections 41 and 42 because high or super-pressures are not required, and, therefore, true mechanical threads are not necessary between these sections. The relatively large diameter of the barrel, as compared with its length enables a very material reduction in the operations necessary in forming the barrel as compared with the formation of the relatively long and relatively small diameter barrels of the high and super-pressure guns which have been previously employed. The structure and connections need not have the strength or tightness necessary to resist the high and super-pressure heretofore thought necessary. This cost is thereby materially reduced.

The upper barrel section or cap 41 is provided with a central or axial opening 49 in alignment with the opening 45 and the margin of the upper section 41 is turned upwardly about this opening 49 at 50. Rigidly secured in any suitable manner in the opening 49 is a bushing 51 which is internally threaded at 52 for threaded engagement with the threaded shank 53 of the piston stem, the upper end of which is bent to form or otherwise provided with a suitable handle 54. An abutment formed by an embracing ring 55 secured in a circular groove 56 in the piston stem forms a stop for engaging the upper end of the bushing 52 to limit the downward movement of the piston 58. As already pointed out, the lubricant barrel of the gun is of relatively large diameter and relatively short length. Its length is preferably less than its diameter.

The piston or plunger 58 is composed of two dished or generally spherical relatively thin piston discs 60 and 61 secured centrally to the lower end of the piston stem 53 as by passing a reduced portion 62 thereof through the discs 60 and 61 and heading or riveting over the lower end of this reduced portion at 63. Marginally, a self-sealing gasket 65 preferably of leather or other suitable material is suitably secured at 66 between the outer margins of the discs 60 and 61, and the outer edge of this self-sealing gasket is turned down at 67 and has sealing cooperation with the inner periphery of the barrel of the gun. The gasket 65 may have a relatively large central opening 68 eliminating weight and expense and making the gasket in the form of an annulus.

To receive the inner margin of the gasket between the discs and to facilitate securing of the same there, the outer margin of the lower disc 61 may be offset as shown at 69. Nozzle 47 has its upper end formed outwardly as shown at 48 and engages in a suitably formed opening 46 in barrel portion 42 of the gun. Both of these parts may be formed as shown by a simple stamping operation, and when assembled may be spot welded at 45 to provide a rigid connection therebetween.

The connector 36 at the lower end of the nozzle 47 comprises a fitting having a reduced upper end 72 threaded at 73 into the lower end of the nozzle 47. This fitting has a reduced or relatively restricted discharge opening 74 axially thereof and adapted to open from the nozzle 47. The body of the fitting is counterbored at 75 to receive a ball check valve 76 and a spring 77 for seating the valve 76 upwardly to its seat around the opening 74. Below the counterbore 75 the body of the fitting has a second counterbore 78 in which a bushing 79 is secured as by a pressed fit. The bushing 79 confines the spring 77 and secured in the counterbore 78 beneath this bushing 79 is a felt or other suitable yielding washer 80 which is adapted to abut the outer end of the lubricant receiving nipple when the quick detachable threaded connection is effected between the threads 35 thereof and the internal threads 82 in the counterbore 78 beneath the washer 80. The bushing 79 and washer 80 have relatively restricted registering apertures 83 through which the lubricant is discharged from the nozzle 47 and into the fitting 30 or such other fitting as may be provided at the bearing. In addition, the bushing 79 is counterbored upwardly to complete the chamber for the spring 77. The enlarged lower end of the fitting 36 forms a shoulder which abuts the lower end of the nozzle 47 at 85 and the outer periphery of the enlarged lower end is preferably knurled, as shown in Fig. 26, to facilitate quick detachable threaded engagement with the bearing nipple.

Of course, any other suitable check valve might be provided at the outlet of the gun, it being understood that the sealing parts heretofore required for guns which develop a high pressure are not necessary as the gun illustrated is a low pressure gun.

From the foregoing, it will now be apparent that, in order to lubricate a bearing the fitting 36 at the lower end of the nozzle 47 is threaded into engagement with the nipple at the bearing and the desired charge of lubricant is supplied from the gun to the bearing with relatively little pressure, because of the removal of most of the resistance to the incoming lubricant at the bearing. Lubrication is not only obtained with from 10 to 25 pounds pressure per square inch instead of from 300 to 10,000 pounds per square inch with the advantages already referred to, but the lubrication of the bearing under this low pressure is improved over what has been considered as acceptable lubrication under high and super-pressures, as already explained.

In the embodiment of Figs. 16 and 17, the through channels, instead of being continuous to the opposite ends of the bearing, are formed by channels 90 leading from the cross openings 93 to one end of the bearing, and channels 92 leading from cross-openings 93 to the opposite end of the bearing. Each of the channels 90 and 92 is a through channel from its cross opening to one end of the bearing, and these channels supplement each other and form, in effect, continuous through channels to both ends of the bearing.

These channels are again shown in the bolt 94, but it is to be understood that, as before, they may be in the bushing 95 or directly in the female bearing part 96 or part may be in the bolt and part in the bushing or female bearing part. The shackle links are indicated at 8a and 9a, and one end of the bolt 94 is headed at 97 while the opposite end is provided with a nut 98. The free lubricant escape end channels are designated at 14a.

In Figs. 18 and 19, the through groove or channel is in the form of a helical groove 100 again formed in the bolt 101, although it may be formed in the bushing 102 or in the female bearing part, in which case, where the cross opening 104 is in the bolt, it may communicate with a helical channel in the bushing or in the female bearing part by means of a circular groove formed around the bolt 101 and intersecting the outer end of the cross opening 104.

In the embodiment of Figs. 20 and 21, some of the through channels 110 are formed in the bolt 111, while others are formed in the bushing as indicated at 112, although they may be formed directly in the female bearing 113 where there is no bushing. A bushing is shown at 114. Cross ducts 115 open into communication with the through channels 112 and into communication with an annular groove 116 in the bolt 111, which annular groove 116 in turn communicates continually with the through channels 110.

In the embodiment of Figs. 12, 13, 14 and 15, the through channels 120 are similar to the through channels 20 for the bolt 7 of Fig. 10, with the exception that they are formed in the bushings 121 instead of in the bolts or male bearing parts 122.

The cross ducts 123 open radially through the bolts 122 into communication with annular grooves 124 formed peripherally around the bolts and intersecting the outer ends of the cross ducts 123. The annular grooves 124 maintain continuous communication between the cross duct 123 and the through channels 120. The bushing 121, shown around the upper bolt 122, is a split bushing, split at 126. It may be formed of flat stock rolled to shape, as already referred to. The through grooves 120 may be formed by broaching, stamping, pressing, machining, drawing or otherwise, as previously explained.

Figures 12, 14, 15:
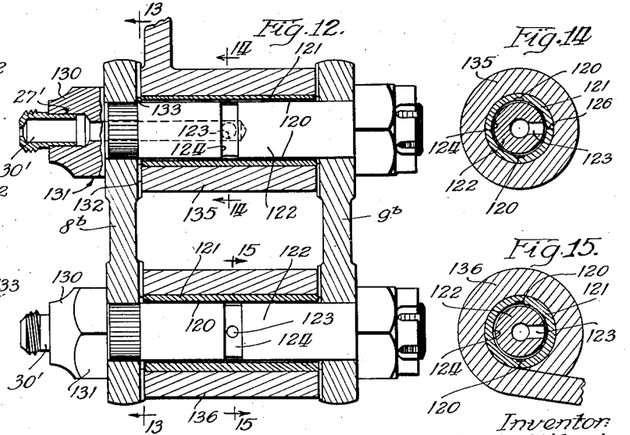
Figure 12 is a section similar to Figure 10 showing another embodiment of the present invention in connection with another form of shackle connection between the frame and spring of an automobile.
Figure 14 is a transverse section taken on the line 14—14 of Figure 12.
Figure 15 is a transverse section taken on the line 15—15 of Figure 12.
Figure 13:
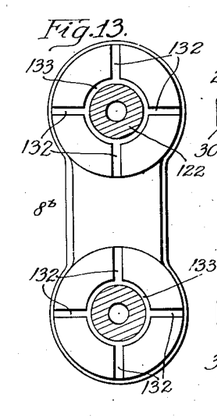
Figure 13 is an end elevation of the shackle connection shown in Figure 12 partially in section the view being taken generally on line 13—13 of Figure 12.

In Figs. 12 and 13, the shackle links are indicated at 8b and 9b, but the bolts 122, instead of being formed integral with one link at one end, as in the embodiment of Figs. 10 and 11, pass through the link 8a and are headed at 130. The heads 130 are formed at 131 to receive a wrench or other tool and in this case the nipples 30' are press fitted in recesses 17' in the heads 130 instead of directly in one of the shackle links. The free lubricant escape end grooves in the inner surfaces of the shackle links are indicated at 132 in Fig. 13, and annular grooves are indicated at 133 for maintaining these free escape end grooves 132 in communication with the through grooves 121. The anchoring eye is indicated at 135 and the spring eye at 136 in Figs. 12, 14 and 15.

The bearing illustrated in Figs. 22, 23 and 24 is the shackle bearing of another form of standard type for use on automobiles.

The shackle bolt 150 is the upper shackle bolt and is supported in a bearing member 151 formed on a bracket 152 which is usually secured to the frame member. The bolt 150 is held definitely in position by the slabbed-off face 153 engaging the shoulder 154 on the shackle arm 155. A companion link 156 connects the opposite end of the bolt 150 with the other shackle bolt (not shown). The nut 157 is drawn up to clamp the bearing part 151 between the shackle links 155 and 156. A washer 158 is interposed between the shackle link 155 and the bearing part 151. The bearing part 151 is provided with a bushing 160 surrounding the bolt 150 and four equally spaced longitudinal through channels 162 are provided in the inner surface of the bushing 160 and extend from one end of the bearing to the opposite end. The axial duct, into the outer end of which the lubricant is delivered into the shackle bolt, is indicated at 163 and this duct opens through cross ducts 164 to a circular duct 165 encircling the bolt 150 and intersecting the outer ends of the cross ducts 164. The circular groove 165 opens continually into the through channels 162 regardless of turning movement between the bolt 150 and the bearing part 151. The free lubricant escape end channels are provided at one end at 168 in the inner surface of the washer 158 and at the opposite end these channels 170 are provided in the inner surface of the shackle link 156. An annular groove 172 in the inner surface of the washer 158 maintains the through channels 162 in open communication with the free escape end channels 168, regardless of relative turning movement between the washer and the bearing part 151 and a similar annular groove 174 in the inner surface of the shackle link 156 maintains the end channels 170 in free communication with the through channels 162 regardless of relative turning movement between these parts.

In the embodiment of Figs. 22, 23 and 24, the lubricant charging nipple 180 is connected with and opens into the axial duct 163 and, instead of having driving fit, is threaded directly into the bolt 150 at 182. In this case, the nipple 180, instead of being open when the lubricant source is disconnected therefrom, is closed by a conical cork check valve 185 cooperating with the correspondingly tapered or conical bore 186 at the outer end of the nipple 180. The cork check valve is preferable, but this may vary. This valve is seated by a spring 188 confined at its inner end by an annular flange 190 at the inner end of the nipple 180. Obviously, the nipple 180 of this embodiment may be used in connection with any of the other embodiments, or the other nipple may be used in this embodiment, or the nipples may be varied from the particular structures shown, as, for example, in providing a pressed contact instead of a rigid mechanical connection. The outer end of the nipple 180 is provided with a relatively short quick thread 192 for connection with the grease gun.

In Fig. 27, I have shown an angle or elbow nipple for use in connection with the present invention. This nipple comprises a nipple part 200 threaded at 201 for threaded engagement with the bolt or bearing part and a tubular nipple part 202 having driving fit in the part 200 and disposed normally thereto. The inner chamber or duct of the part 202 is in open communication with the chamber 204 of the part 200, the interior of the part 200 being recessed at 205 to promote this communication. The inlet or receiving opening 206 of this nipple is normally closed by a ball check valve 207 seated against the struck-in margin or flange 208 at the inlet 206 by a spring 209 which is confined at its opposite end by an internal annular flange 210 within the nipple part 202. The inlet end of the part 202 is externally threaded at 215 for quick threaded connection with the cooperating connector of the grease gun.

Now referring again to Figure 6, and particularly the upper shackle bearings, I show herein a shackle bolt 220 with a head 222 and nut 223 holding the same in the upper ends of the shackle links O and P. The inner faces of these shackle links are provided with radially extending passageways 224 facing toward each other. The head 222 receives a lubricating nipple 225 which is constructed as disclosed and claimed in my copending application filed September 28, 1929, and bearing Serial No. 395,878. The bolt 220 has a longitudinal drilling 226 and the vertical cross-drilling 227, this cross drilling communicating with a circumferential distribution groove 228 which has the same general function as the distribution groove Q, disclosed in the structure immediately below it.

The bushing 229 which is disposed in the cylindrical sleeve 230 forming a part of the frame horn or the like, bears upon the cylindrical surface of the bolt.

For example, if the bearings were relatively free, one turn of the handle 239 might discharge sufficient grease to lubricate the bearings. If, on the other hand, the bearings were thoroughly well clogged up, that is filled up with non-lubricating particles, the operator might be compelled to make two or three turns of the handle 239 in order to force any grease whatsoever into the bearings and after the completion of these forward turns he has to turn the handle backwards several times to reduce the pressure in the gun barrel to such an extent as to enable him to unhook or unscrew the coupling between nozzle and nipple. This has been due largely to the fact that any air bubbles in the grease have prevented accurate measurement, due to the expansion of such air after being placed under pressure, next due to the leakage incident to the use of high pressure, next due to the difficulty of determining in the mind of the operator or securing in fact any definite relation between a predetermined angular movement of the handle 239 and a definite discharge of grease into the bearing.

The same thing is true in respect to the contact type where the necessity for high pressure has tended to cause leakage and even though a definite predetermined stroke of the gun were made, there was no assurance of securing the discharge of a desired amount of lubricant into the bearings.

Now consider the possibilities of my present bearings, as shown in Figure 9. In the upper bearing 235 provided with the solid coupling type of nipple 237 and screw thread operated type of discharged gun 238, due to the free escape channels which the bearing 235 embodies, a definite turn of the handle 239 results in the definite discharge of a predetermined quantity of lubricant into the bearings. Upon uncoupling the gun the grease does not tend to leak out of the gun, as has heretofore been the case.

The bearing 235 is shown as having substantially the construction described in detail in Figure 6.

The bearing 236 is like the bearing 235 and it is provided with a contact type of nipple 242. The gun 240 is provided with a contact nozzle 243. The gun 240 is further provided with a spring 244 making a definite return stroke of the plunger, so that each operation of the gun will automatically provide a predetermined discharge. Due to the elimination of resistance in the bearing, the discharge of a definite quantity of grease is greatly facilitated as above described. The same thing is true in a centralized lubricating system. The present form of bearing has a great advantage, first in providing a better bearing and next in permitting the resistance of the resistance type metering units to be relatively low and yet many times higher than the resistance of the bearings. Consequently, the distribution of lubricant throughout the system may be much more easily accomplished where a centralized system is employed.

By the term "heavy lubricant" employed herein I mean to include high viscosity oil, grease or the like.

Obviously I do not intend to be limited to the details of construction, except as they are specifically recited in the claims, since I conceive the method of operation and the structure herein disclosed to be broadly new.

I claim:

1. In combination two bearing members having cooperating bearing surfaces with a duct leading to the bearing surfaces and a substantially free escape passageway communicating with the duct to receive lubricant therefrom and communicating laterally with the bearing surfaces to deliver lubricant thereto and substantially freely opening longitudinally outside of the bearing surfaces for the ejection of impurities away from the bearing surfaces.

2. In combination two bearing members having cooperating bearing surfaces with a duct leading to the bearing surfaces and a substantially free escape passageway communicating laterally with the bearing surfaces to deliver lubricant thereto and freely opening longitudinally outside of the bearing surfaces for the ejection of impurities away from the bearing surfaces, said bearing members being organized to have oscillatory motion with respect to each other and detachable means for intermittently discharging a high viscosity lubricant into the duct.

3. In combination two bearing members having cylindrical bearing surfaces with the duct leading to the said bearing surfaces and having radially extending bearing surfaces at the ends of the cylindrical bearing surfaces, there being a substantially free escape passageway extending from the duct longitudinally along the cylindrical bearing surfaces and communicating laterally with them, there being a radially extending substantially free escape passageway along one of said radially extending bearing surfaces, and there being a circumferential passageway providing substantially free communication from the substantially free escape passageway of the cylindrical portion of the substantially free escape passageway of the radially extending portion.

4. A bearing comprising the combination of two relatively movable members, having cooperating bearing surfaces adapted to be separated by a film of lubricant, there being a supply duct for lubricant extending to the meeting surfaces, one of the members having a groove extending from said duct to the limits of the bearing surfaces and opening substantially freely away from the bearing surfaces for the discharge of previously deposited lubricant by the introduction of a fresh charge of lubricant through said duct and groove.

5. A bearing comprising the combination of two relatively movable members, having cooperating bearing surfaces, there being a supply duct for lubricant extending to the meeting surfaces for delivering fresh lubricant to the surfaces, one of the bearing members having a groove in its surface extending from the said duct to the limits of the bearing surfaces for the substantially free discharge of previously deposited lubricant away from the bearing surfaces by the introduction of a fresh charge of lubricant through said duct and groove, said groove functioning in the following capacities, namely; first, to receive and retain the deposit of non-lubricating particles from between the bearing surfaces, second, to provide a passageway through which the deposited non-lubricating particles may be swept away by the injection of fresh lubricant and third, to act as a storage reservoir for lubricant between injections of fresh lubricant.

6. A bearing adapted for intermittent lubrication by application of a heavy lubricant comprising the combination of two bearing members having cooperating bearing surfaces, at least one of said members having a groove at its bearing surface covered by the other bearing member, there being an inlet passageway for lubricant communicating with said groove and a grit escape passageway providing a free outlet for the contents of the groove, said bearing members being so organized as to have relatively slow speed motion of their surfaces with respect to each other.

7. In a lubricating system of the intermittent, non-circulatory type the combination of bearing members having bearing surfaces adapted to be lubricated by heavy lubricant, said bearing members having a supply duct and having a groove extending between said members opening laterally to said bearing surfaces and serving as a reservoir for lubricant for supplying said surfaces between operations of lubricant injections, said groove having a free escape opening outside of said surfaces to carry away substantially freely impurities from the bearings and an inlet connection for said supply duct, having closure means for preventing the entry of impurities between operations of lubricant injections.

8. In a lubricating system of the intermittent, non-circulatory type the combination of bearing members having bearing surfaces adapted to be lubricated by heavy lubricant, said bearing members having a supply duct and having a groove extending between said members opening laterally to said bearing surfaces and serving as a reservoir for lubricant for supplying said surfaces between operations of lubricant injections, said groove having a substantially free escape opening outside of said surfaces to carry away substantially freely impurities from the bearings and an inlet connection for said supply duct, having closure means for substantially preventing the entry of impurities between operations of lubricant injections, and lubricant supply means adapted to be put into communication periodically with said inlet connection for discharging fresh charges of lubricant into the groove.

9. In combination with a vehicle spring, a pair of cooperative bearing elements for said spring having interengaging substantially co-axial bearing surfaces, one of said elements having a lubricant charging duct formed therein adapted to convey lubricant supplied to it under pressure to said surfaces, the bearing surface of at least one of the elements being so grooved as to form a channel freely communicating with said duct, and with atmosphere, to conduct without appreciable resistance lubricant from the duct and impurities selectively retained by the filtering action of the channel to atmosphere longitudinally of said bearing surfaces and in contact with both thereof.

10. In a bearing substantially as defined in claim 9 in combination with means forming discharge channels extending angularly outwardly from the said first named channel.

11. In a bearing substantially as defined in claim 9 in combination with a pair of shackle links one of said elements supported by the shackle links, the other element interposed therebetween.

12. In a bearing substantially as defined in claim 9 in combination with a pair of shackle links one of said elements supported by the shackle links, the other element interposed therebetween and means forming discharge channels extending outwardly from the said first named channel.

13. In a bearing substantially as defined in claim 9 in combination with a lubricant receiving nipple affixed to an end of the element having the duct and communicating directly with said duct, said duct comprising a bore of said element, said nipple adapted for lubricant communicating engagement by a lubricant gun nozzle applied thereto, the said bored element being annularly grooved intermediate its ends, said element bore terminating at its inner end in free communication with the annular groove.

14. In a bearing substantially as defined in claim 9 wherein the bearing surface channel groove extends from end to end of the bearing and communicates with atmosphere at at least one of its ends.

15. In a bearing substantially as defined in claim 9 wherein a second channel forming a longitudinally extending groove is provided in at least one of said elements, spaced throughout at least most of its length from the first named groove and providing a multiple passage for lubricant from the duct to atmosphere.

16. In a bearing substantially as defined in claim 9 in combination with means forming discharge channels extending angularly outwardly from the said first named channel at the ends of said bearing and means forming an annular channel intersecting both said first named and the second named channel.

17. In combination, two bearing members having bearing surfaces adapted for relative movement, one of said members being provided with a lubricant supply duct leading to said surfaces at substantially the center thereof, and one of said surfaces being provided with a groove communicating with said duct and extending the full length of said bearing surface, the ends of said groove being open to the atmosphere to provide a vent through which the impure lubricant may be discharged upon supplying lubricant to said bearing through said duct.

In witness whereof, I hereunto subscribe my name this 5 day of October, 1929.

OSCAR U. ZERK.